P. HEIMLICH.
Oyster-Opener.
No. 210,032. Patented Nov. 19, 1878.
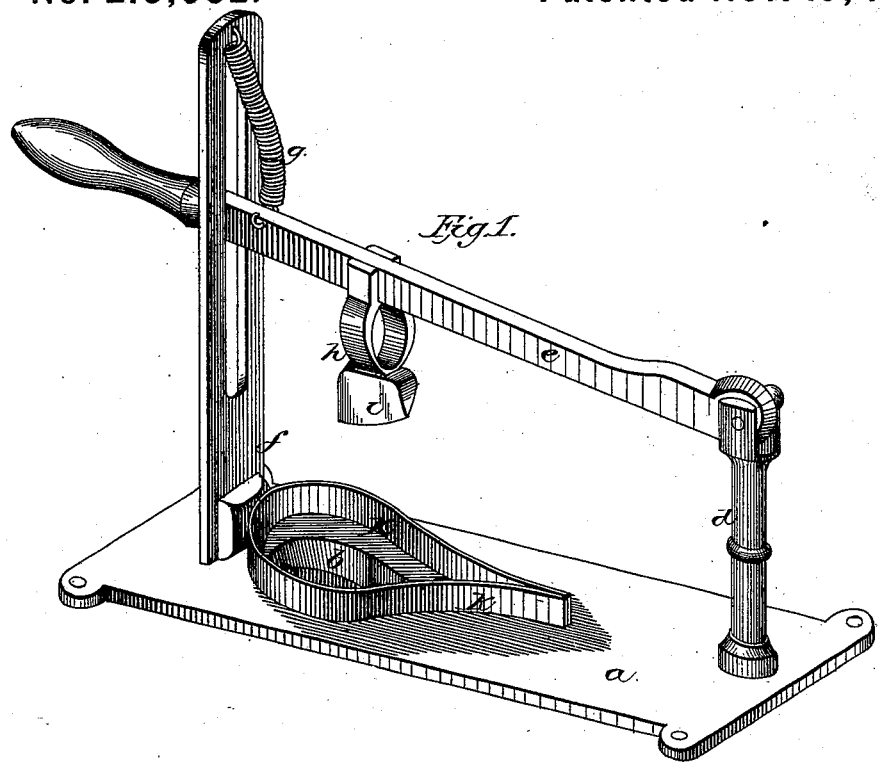
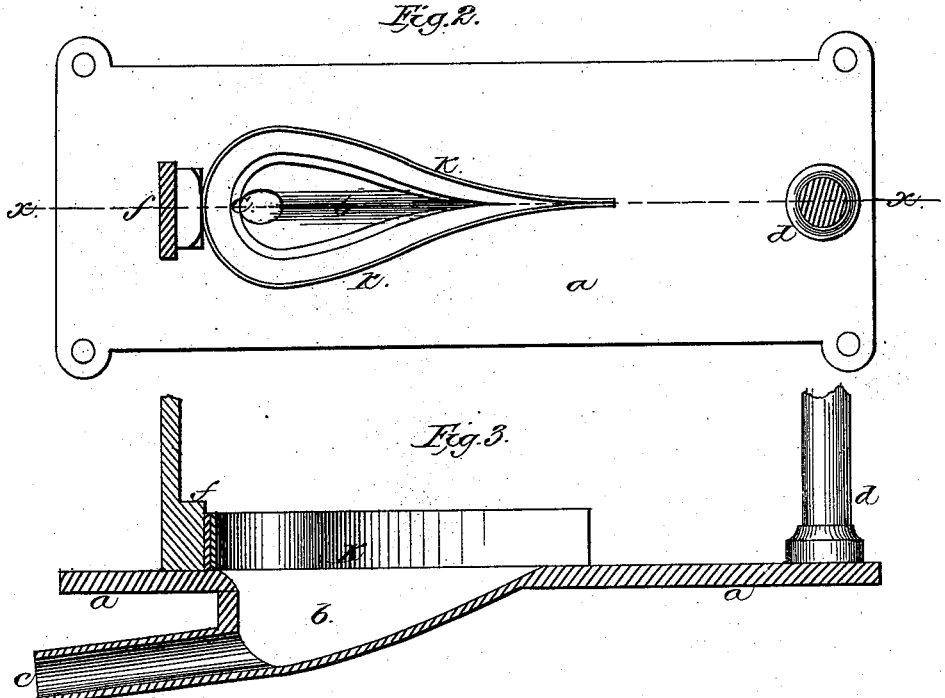

UNITED STATES PATENT OFFICE.

PETER HEIMLICH, OF SYRACUSE, NEW YORK.

IMPROVEMENT IN OYSTER-OPENERS.

Specification forming part of Letters Patent No. 210,032, dated November 19, 1878; application filed August 22, 1878.

*To all whom it may concern:*

Be it known that I, PETER HEIMLICH, of Syracuse, Onondaga county, New York, have invented certain Improvements in Apparatus for Opening Oysters, Clams, &c., of which the following is a specification:

This invention consists of a certain combination of parts forming an apparatus or instrument for opening oysters, clams, and other shell-fish, by which the meats are extracted entire and with great rapidity, and the liquor from them caught and conveyed away without flowing upon the bench or operator, or soiling his clothes.

The construction is as follows, referring to the accompanying drawing, in which—

Figure 1 is a perspective view of the machine. Fig. 2 is a vertical section on line $x\,x$, Fig. 3. Fig. 3 is a plan of the base.

The base $a$ is made of metal or other suitable substance, fastened onto a bench or table, and having an oblong recess in it at $b$, the sides and bottom of which incline downward to the aperture or outlet, from which a spout, $c$, leads off, to which a tube may be attached, to communicate with a tub or other receptacle in any convenient place lower than the spout $c$. Near one end of the base $a$ there is a vertical standard, $d$, to the top of which a horizontal lever, $e$, is pivoted, and near the broad part of the oblong recess $b$ there is another vertical standard, $f$, with a slot through it, in which the lever $e$ works. A handle forms the end of this lever, by which it is raised and lowered, and a spring, $g$, or its equivalent, elevates the lever when released from downward pressure. To the lever $e$ there is affixed a bow-shaped spreader, $h$, projecting laterally each way below the lever, to which it is attached, and to this spreader is affixed a wedge-shaped knife, $i$, sharpened on its lower edge, and made somewhat thick on the back. A forked spring rim or curb, $k$, surrounds the recess $b$ in the base, which is affixed to the slotted standard $f$ at its looped end. At the other end the two sides spring together, but open, if necessary, to receive the shell-fish.

The operation of this apparatus as thus constructed is as follows: An oyster or clam, &c., is inserted edgewise into the recess $b$, with the hinge up, and is surrounded and supported by the spring $k$. The knife $i$ is then brought down upon the hinge-joint in the shell by means of the lever $e$, and severs the two halves of the shell, which are then opened by the spreader $h$ and separated, and then, by bringing the shell retaining the meat into contact with the knife as it is raised out of the recess, the meat is released therefrom, while the liquor contained therein runs through the spout $c$ to its receiver.

Having thus fully described my invention, I claim—

1. In combination with an oyster-opener constructed substantially as herein described, the base-plate having a recess, $b$, therein, with a spout, $c$, leading therefrom, as set forth.

2. The spring-curb $k$, surrounding the recess $b$, in combination with the base-plate $a$, substantially as and for the purposes specified.

3. The combination of the wedge-knife $i$ and spreader $h$, for opening shell-fish, substantially as and for the purposes described.

PETER HEIMLICH.

Witnesses:
  J. J. GREENOUGH,
  F. HOWARD.